United States Patent Office 2,778,750
Patented Jan. 22, 1957

2,778,750

ION EXCHANGE PURIFICATION OF WHEY IN THE PREPARATION OF LACTOSE

Maurice E. Huil, La Grange, Ill., assignor to Armour and Company, Chicago, Ill., a corporation of Illinois No Drawing. Application March 24, 1953,
Serial No. 344,480

3 Claims. (Cl. 127—31)

This invention relates to the preparation of lactose. More particularly, this invention relates to a method of preparing crystalline lactose from whey.

Whey is a by-product obtained in the manufacture of cheese. It is composed mainly of lactose, whey proteins (lacto-proteins), inorganic salts and water. The lactose is the most valuable constituent but the whey proteins are also of commercial value. Therefore, it is desired to recover lactose in a highly purified form, while at the same time recovering the whey proteins in usable condition.

The U. S. P. standard for lactose requires a fine, white, dry, odorless powder of not less than 97% strength as determined polarimetrically. The impurities must not exceed more than 0.020% nitrogen, 0.020% fat, and 0.050% ash. While commercial lactose does not have to meet the U. S. P. standard for all uses, it is desired to have it in highly purified form for most uses. One of the main uses of lactose is in the feeding of infants because the lactose content of cow's milk is less than that of human milk. Lactose is also widely employed in the confectionery industry, while in the pharmaceutical industry lactose is frequently incorporated as a filler in tablet formulations.

The present industrial practice for the preparation of highly purified lactose from whey is to subject the whey to crystallization after certain pretreatments, thus producing crystalline lactose. One of the major problems in the field is that the presence of whey proteins in the crystallization step interferes with the crystallization, and this is especially true when the whey is concentrated to the optimum solids content for lactose crystallization. The presence of the whey proteins tends to increase the viscosity of the concentrate, and to give a crystalline product high in protein, ash, and moisture. This problem is particularly acute because it is necessary to heat-treat the whey prior to crystallization for the purpose of killing the microorganisms and thereby preserve the quality of the whey. The required heat treatment apparently tends to increase the viscosity of the proteins.

Because of the difficulty of crystallizing lactose from a concentrated solution in the presence of whey proteins, it has been suggested that the proteins be completely removed prior to the crystallization step. This can be accomplished by heating the whey at temperatures high enough to coagulate the proteins, after which they can be filtered out. One serious objection to this proposal is that it involves the loss of the whey proteins, which are of considerable value as a source of lacto-proteins for use by the confectionery industry, as an ingredient in animal feeds, etc.

A considerable effort has already been made to solve the problem of the interference of whey proteins in the crystallization of lactose without destroying the whey proteins. One method requires a rather precise pH adjustment of the whey to around 7.4, which is said to have a stabilizing effect on the proteins during pasteurization of the whey. A further refinement of this method is to add sodium tetraphosphate to prevent the precipitation of tricalcium phosphate from the whey during the lactose crystallization. However, none of the prior methods for reducing the interfering effect of the whey proteins has been entirely satisfactory.

It is therefore a general object of this invention to provide a process wherein lactose can be crystallized from concentrated whey in the presence of whey proteins without any objectionable interference by the whey proteins, and at the same time preserving the proteins for subsequent recovery and use. Further objects and advantages will appear as the specification proceeds.

This invention is based in part on the discovery that even though substantially all of the whey proteins are not coagulated and remain in solution after pasteurization of the whey, that the pasteurization has an adverse effect on the proteins which accentuates their interference with the lactose crystallization. It has been further discovered that this undesirable heat modification of the whey proteins can be substantially avoided by removing the calcium ions from the whey prior to pasteurization. This procedure has proven so successful that a pH adjustment is not required at any point in the process, thus permitting the ordinary pH of the whey to be used in the pasteurization and subsequent processing steps.

In practicing the method of this invention, the starting material is preferably fresh whey, that is, whey in which the lactose and proteins are in recoverable condition. The principal whey available for processing in the United States is Cheddar whey, but whey by-products from other types of cheese manufacturing, such as Swiss cheese, etc., can be employed.

A typical composition for Cheddar whey may be set out as follows:

| | |
|---|---|
| pH | 5.8 to 6.2 |
| Total solids | percent__ 6.5 |
| Lactose | do____ 5.0 |
| Proteins | do____ 1.0 |
| Inorganic salts | do____ 0.5 |

The major portion of the inorganic salts are calcium salts although sodium salts are also present.

As a first or preliminary step in practicing the method of this invention, the whey is processed to reduce the calcium ion concentration of the whey. Preferably, the major portion of the calcium ions are removed from the whey. Reduction of the concentration of calcium in the whey to below 0.03% and, preferably, to below 0.02%, is satisfactory. However, the calcium ions can be substantially completely removed by known procedures, such as subjecting the fresh whey to a cation exchange process. Any known cation exchange process for exchanging calcium ions in aqueous solution can be employed. Preferably, the whey is brought into contact with a cation exchange material in an alkali metal cycle, viz., a sodium cycle. Various cation exchange materials can be used, such as cation exchange resins of the nuclear sulfonic polystyrene base, phenolic methylene sulfonic acid and carboxylic types, like the "HCR" cation exchange resins of the Dow Chemical Company and the "Amberlite" cation exchange resins of Rohm & Haas, or other cation exchange materials like Zeolite, green sand, sulfonated carbonaceous types, etc.

By way of specific example, a bed of a cation exchange resin of sufficient size and capacity to remove substantially all of the calcium ions from a batch of fresh whey is prepared and treated with a 10% aqueous solution of sodium chloride to put the resin in a sodium cycle. The whey is then percolated through the bed to exchange the sodium ions for the calcium ions in the whey, and thereby effecting a great reduction in the concentration of calcium ions.

The next step is the pasteurization of the whey of reduced calcium ion concentration. Pasteurization is generally understood as a relatively mild heating which significantly reduces the count of living microorganisms but does not coagulate the proteins. This is the meaning which is intended herein, since the heating should be at such a temperature and for such a time that the number of living microorganisms in the whey is reduced to a non-objectionable level without coagulating the proteins. It is desired to have the whey solution remain substantially clear, and to be free of filterable proteins after the pasteurization. The particular temperature conditions are well known in the art for achieving these results. By way of specific example, the whey can be heated at a temperature of from 143 to 147° F. for from 25 to 30 minutes. Instead of a holder type pasteurization, an equivalent flash pasteurization can also be used. However, temperatures above 175° F. should not be used because the coagulation of the proteins is very difficult to avoid at such temperatures even though the time of heating is very short.

The pasteurized whey is then concentrated according to known procedures for preparing whey for lactose crystallization. For example, the water can be removed by evaporation under vacuum employing pan-type evaporators. For this purpose a temperature of 130° F. and 25 inches of mercury vacuum is suitable. The pasteurized whey should be concentrated to a total solids content of between 50 to 65%. The optimum solids concentration for crystallization is usually around 62% solids.

The crystallization of lactose from the concentrated whey can also be carried out according to procedures well known in the art. All that is required is that the condensed whey be cooled slowly until no further crystallization of the lactose occurs. The crystallized lactose can then be separated from the supernatant, as by filtration or centrifugation. The separated lactose crystals can then be washed, etc., to prepare them for commercial use. The supernatant can be used as a source of lacto-proteins. The nutritive value of the supernatant will be high because the proteins have not been denatured in the processing. Apparently, the reduced calcium ion concentration is important in protecting the proteins during both the pasteurization and concentration steps.

Among the results accomplished by the process described, as compared with prior processes, are the following:

1. The crystallization of the lactose proceeds more rapidly and with less interference due to the whey proteins.
2. The lactose is obtained in higher yields and has a greater purity in regard to both protein content and ash content.
3. The supernatant by-product is in a much better condition for use as a source of lacto-proteins.

This invention is further illustrated by the following specific examples.

*Example I*

Uncondensed fresh whey is passed through a cation ion-exchanger (e. g., the "HCR"-type resin or a member of the "Amberlite" series), which has been previously treated with a sodium chloride solution of about 10% concentration. In this step, the calcium ions in the whey are replaced by sodium ions. This decreasing of calcium ions results in a superior lactose product from the whey, and simplifies precipitation and crystallization. The resins employed may be regenerated and re-used.

The whey so treated with the ion exchanger is then pasteurized by heating to 143–147° F. This pasteurizing accomplishes two purposes: First, it destroys bacteria in the whey which otherwise cause rapid breakdown of the lactose present; and, secondly, pre-heats the whey preparatory for the next step.

The pasteurized whey is then reduced in volume at about 130–135° F., and a vacuum of 25 inches of mercury. These conditions are maintained until a volume reduction is attained, wherein, the concentration of total solids in said condensed whey is 62.0%.

The condensed whey containing 62% total tolids is then seeded with a small amount of crystalline lactose and allowed to cool slowly in an agitating crystallizer, until lactose crystallization is complete. The lactose crystals so obtained are centrifuged and washed with water until free of mother liquor and excess water.

A product displaying the following average composition is obtained by this method:

| | Percent |
|---|---|
| Lactose | 95.08 |
| Moisture | 4.60 |
| Ash | 0.10 |
| Protein | 0.22 |

The yield obtained indicates about 3.45% by weight, of the original whey starting material, and about 70–80% of the lactose present in the original whey starting material.

*Example II*

An "HCR" ion exchange resin column is washed with water to remove impurities, then treated with a sodium chloride solution (approximately 10%) after which it is again washed with water. The crude whey is processed through the column wherein an exchange of sodium-calcium ions takes place. The spent resin can be regenerated if desired.

16,400 grams of whey thus treated is heated to 143–147° F. for pasteurization. The temperature and pressure is then adjusted to about 130–135° F. and to a vacuum of 25 inches of Hg and the volume is reduced to approximately 1300 ml. The condensed whey amounting to 1645 g. with 66.4% total solids is adjusted to 62% T. S. by adding 177 cc. of water. The supersaturated solution is seeded with crystalline lactose and allowed to cool slowly in an agitating crystallizer. 624 gms. of washed crystalline lactose is obtained.

The wash water containing an appreciable amount of lactose is combined with the next batch of ion-exchange treated whey.

*Example III*

Fresh whey was treated with ion exchange (Dowex 50) which had been previously regenerated with a 10% sodium chloride solution. 16,400 gms. of this whey having a calcium content of approximately 0.01% was pasteurized at 143° F. for 30 minutes and then concentrated in a vacuum evaporator to 62% total solids. A temperature of 130–135° F. and a vacuum of approximately 25 inches of mercury was used for concentrating the whey to 1511 grams. The lactose was crystallized overnight and the lactose centrifuged and washed the following day. The following results were obtained:

| | | |
|---|---|---|
| Lactose yield | grams | 569 |
| Moisture content | percent | 4.6 |
| Protein | do | 0.20 |
| Ash | do | 0.10 |
| Yield | do | 3.30 |

The centrifuging and washing operation was carried out without difficulty—washed very readily.

*Example IV*

16,400 gms. of a similar whey as used in Example III and 762 grams of wash water obtained from washing the centrifuged lactose obtained from the above example were pasteurized and concentrated as previously described. 1762 grams of concentrated whey of 62% total solids were obtained. After centrifuging and washing 624 grams of lactose were obtained of the following composition:

| | Percent |
|---|---|
| Moisture | 9.3 |
| Protein | 0.20 |
| Ash | 0.10 |
| Yield | 3.44 |

The addition of the wash water to the above experiment increased the yield and did not affect the crystallization or centrifuging adversely.

While in the foregoing specification specific embodiments of this invention have been set forth for the purpose of illustration, it will be apparent that these embodiments and the details thereof can be varied considerably without departing from the broad idea of the invention, which the following claims are intended to protect.

I claim:

1. A process for recovering crystalline lactose of reduced protein and ash content from fresh pasteurized whey without denaturing the whey proteins, comprising reducing the calcium concentration of fresh whey to less than 0.02% by passing the whey through a cation exchange material in the sodium cycle, heating the whey of reduced calcium content at pasteurizing temperatures without appreciably denaturing the whey proteins, concentrating the pasteurized whey without removing the whey proteins, said heating and concentrating steps being carried out with said whey at an acid pH, and then crystallizing lactose from the concentrated whey in the presence of the undenatured whey proteins.

2. A process for recovering crystalline lactose of reduced protein and ash content from pasteurized, fresh whey without denaturing the whey proteins, comprising reducing the calcium concentration of fresh whey to less than 0.03% by passing the whey through a cation exchange material in an alkali metal cycle, heating the whey of reduced calcium content at pasteurizing temperatures without appreciably denaturing the whey proteins, concentrating the pasteurized whey without removing the whey proteins, crystallizing lactose from the concentrated whey in the presence of the whey proteins, and then separating the crystalline lactose from the undenatured whey proteins.

3. The process of claim 2 in which said cation exchange material is in the sodium cycle.

References Cited in the file of this patent

UNITED STATES PATENTS

| 2,467,453 | Almy et al. | Apr. 19, 1949 |
| 2,477,558 | Almy et al. | Aug. 2, 1949 |
| 2,555,211 | Wallace | May 29, 1951 |
| 2,555,212 | Wallace | May 29, 1951 |
| 2,555,213 | Wallace et al. | May 29, 1951 |
| 2,584,158 | Pratt et al. | Feb. 5, 1952 |